United States Patent [19]

Ronian et al.

[11] 4,010,859

[45] Mar. 8, 1977

[54] LIFTING IMPLEMENT

[76] Inventors: Richard K. Ronian, Rte. No. 1, Box 313, Hazelwood, Mo. 63042; Robert Dale Moses, 3555 Ridgewood Drive, St. Charles, Mo. 63301

[22] Filed: May 12, 1975

[21] Appl. No.: 576,693

[52] U.S. Cl. .............................. 214/77 R; 214/152; 242/84.1 K; 254/150 R

[51] Int. Cl.$^2$ .............................. B60P 1/48

[58] Field of Search ........ 254/150, 186 HC, 186 R; 242/54, 47.01, 72, 84.1 K, 46.21; 214/75 R, 77

[56] References Cited

UNITED STATES PATENTS

| | | | |
|---|---|---|---|
| 2,669,399 | 2/1954 | Wood | 242/84.1 K |
| 3,403,578 | 10/1968 | Morse | 254/150 R |
| 3,454,235 | 7/1969 | Hurley | 242/46.21 |

*Primary Examiner*—Robert J. Spar
*Assistant Examiner*—Lawrence J. Oresky
*Attorney, Agent, or Firm*—Koenig, Senniger, Powers and Leavitt

[57] ABSTRACT

A lifting implement comprising a base adapted to be secured to the floor of a van-type truck or the like adjacent a doorsill thereof, a lifting platform, two pairs of generally parallel connecting arms pivotally connected to the base and to the platform adjacent the outer end thereof, a pair of cable and pulley arrangements interconnecting the base and the platform, and a winch secured to the base at one side thereof. The base has a pair of pulley support members extending upwardly therefrom. Each pulley and cable arrangement has a plurality of pulleys journalled by the pulley supports and the platform and a cable with the cable extending between the pulleys journalled by the support member and pulleys on the platform. Both cables are secured to the winch for simultaneous winding and unwinding thereby to effect uniform movement of the platform.

2 Claims, 5 Drawing Figures

LIFTING IMPLEMENT

BACKGROUND OF THE INVENTION

This invention relates to a lifting implement and more particularly to a lift adapted for installation in a van, pickup truck, or a bus for lifting cargo from ground level to the level of the floor or bed of the vehicle and vice versa so as to enable the cargo readily to be on-loaded and off-loaded from the vehicle. This invention specifically concerns itself with such a lifting implement for transportation of persons confined to wheelchairs.

The transportation of wheelchair patients has long posed a problem. When transported in a conventional automobile, the wheelchair patient is usually transferred from his wheelchair to the automobile seat. The wheelchair is folded up and stored in the trunk or placed behind the front seat. While some wheelchair patients can manage to get in and out of an automobile, by themselves, a substantial number of wheelchair patients require another person to assist them.

With the advent of passenger van vehicles, it is now possible for individuals and institutions to own a reasonably sized and reasonably priced vehicle which can transport one or more wheelchair patients while seated in their wheelchairs, thus eliminating the necessity of transferring the patient from his wheelchair to another seat. However, it is difficult to load and unload the patient in his wheelchair into and out of the van. Various ramps and mechanical lifts have been developed to facilitate loading and unloading of the wheelchair patient. Reference may be made to U.S. Pat. No. 3,874,527 in which a typical vehicle mounted ramp for wheelchair patients is disclosed. Among the known prior art lifts is a first type which utilizes a hydraulic cylinder which acts through a chain drive arrangement to move a platform on which a wheelchair is carried from ground level to the level of the floor of the van in a horizontal position. Another known lift utilizes a platform raised and lowered by means of cable and pulleys. A single winch shaft extends from side to side of this second lift below the level of the floor of the van. More particularly, this shaft is journalled in a well adjacent the doorsill in some makes of vans. Two separate cables are wrapped around this shaft so that upon rotation of the shaft, both cables are wound and unwound. With the first mentioned lift, an overhead structure is required within the van through which the wheelchair patient must pass upon entry or exit of the van. This overhead structure reduces the headroom of the van in the area of the door. With the second mentioned lift, the cables often tend to wind unevenly on the shaft and thus are wound at different speeds causing one side of the platform to move more rapidly than the other side. Also, upon raising the platform of the second mentioned lift to its vertical stowed position, continued rotation of the shaft often causes bending of the shaft which results in eccentric winding of the cables which in turn causes jerking of the platform as it is raised or lowered. Also, with the winch shaft of this second mentioned lift extending generally from side to side below the level of the floor, it can only be mounted in certain makes of vans having a well adjacent the doorsill and thus cannot readily be installed in other makes of vans.

SUMMARY OF THE INVENTION

Among the several objects of this invention may be noted the provision of the lift adapted for ready installation in virtually any known make of van, or in other vehicles such as buses or pickup trucks; the provision of such a lift which operates smoothly to lift a wheelchair patient in his wheelchair; the provision of such a lift which is safe even in the event of failure of one of the cables or the winch motor; the provision of such a lift which may be manually raised or lowered; the provision of such a lift which is of rugged construction, which is economical to manufacture, easy to install, and which is reliable and safe in operation. Other objects and features of this invention will be in part apparent and in part pointed out hereinafter.

Briefly, a lift of this invention comprises a base adapted to be secured to the floor of a van-type truck adjacent the doorsill thereof, to the end of the bed of a pickup truck adjacent the tail gate thereof, or to other suitable structure. The lift includes a lifting platform, and two pairs of generally parallel connecting arms, one pair at each side of the platform, pivotally connected to the base and to the platform adjacent the outer end thereof. A pair of pulley and cable means, one for each side of the platform, interconnects the base and the platform, and a winch is secured to the base at one side thereof and has a winding drum for moving the platform via the cable and pulley means in a generally vertical plane between a lowered horizontal position in which the platform is below the level of the base, a raised horizontal position in which the platform is substantially at the level of the base so that the load may readily be moved horizontally on and off the platform, and a stowed position in which the platform is disposed vertically above the base. A pair of pulley supports is secured to the base and spaced apart generally the width of the platform, with the pulley support members extending up above the level of the base. The winding drum of the winch is rotary about a horizontal axis generally parallel to the vertical plane in which the platform moves. Each cable and pulley means comprises a cable, a first pulley journalled by a respective pulley support above the level of the base, a second pulley secured to and journalled by the platform, and at least one idler pulley journalled on the base for guiding the cable from the first pulley to the winding drum of the winch, whereby upon operation of the winch the cables for each of the cable and pulley means are simultaneously wound and unwound from the winch thereby to effect uniform movement of the platform between its lowered, raised and stowed positions.

BRIEF DESCRIPTION OF THE DRAWINGS

Corresponding reference numbers indicate corresponding parts throughout the several views of the drawings.

DESCRIPTION OF A PREFERRED EMBODIMENT

Figure 1:
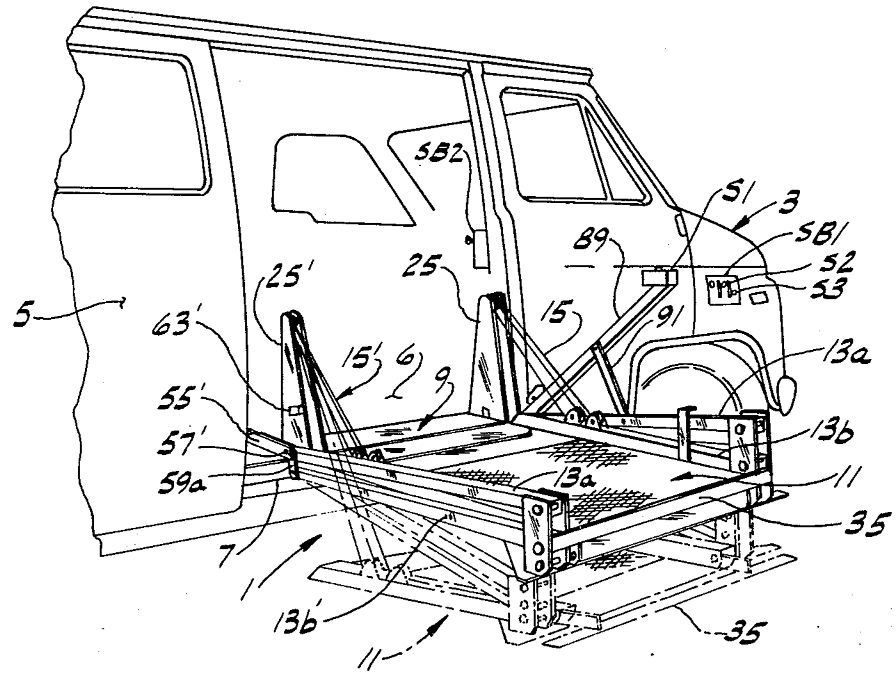
FIG. 1 is a partial perspective view of a van-type vehicle having a lift of this invention installed therein and showing the lift in a raised horizontal position and in a lowered horizontal position (shown in phantom)
Figure 3:
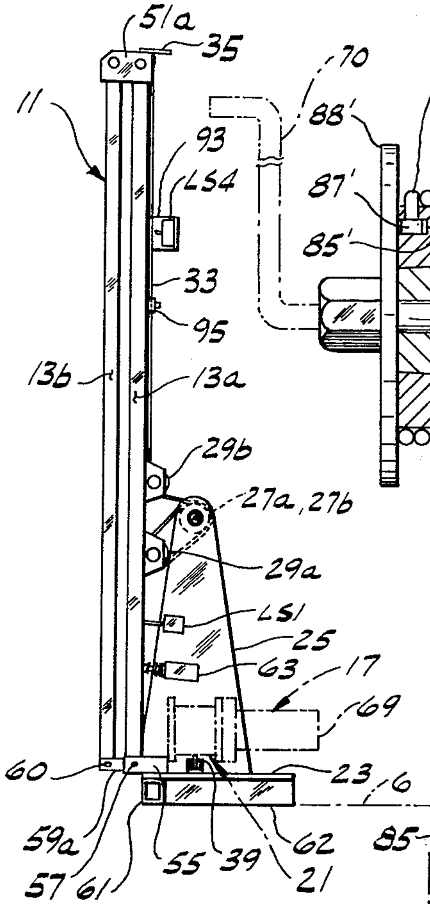
FIG. 3 is a side elevational view of the lift in its vertical stowed position.

Referring now to the drawings, in FIG. 1 a lift 1 of this invention is shown installed in a van-type vehicle 3. The van has a side cargo door 5 which opens to provide access into the van. The van has a floor 6 and a doorsill 7 adjacent the door opening. Lift 1 comprises a base 9 adapted for securement, as by bolting, to floor 6 adjacent doorsill 7, a lifting platform 11, and two pairs of lifting arms 13*a*, 13*b* and 13*a*′, 13*b*′, one pair at each side of the platform, pivotally connected to the base and to the platform. At each side of the platform, a cable and pulley arrangement 15, 15′ is provided for interconnecting the base and the platform. A winch is generally indicated at 17, and is secured to base 9 by means of a bracket 19 welded to the base. The winch has a winding drum 21 rotatable about a horizontal axis X—X for moving platform 11 in a generally vertical plane between a lowered horizontal loading, on-off loading position (shown in phantom in FIG. 1) in which the platform is below the level of the base, a raised horizontal position (as shown in solid lines in FIG. 1) in which the platform is substantially at the level of base 9 and floor 6 of the van so that a patient in a wheelchair or other item may readily be rolled from the platform into the van or vice versa. The platform is also movable to a generally vertical stowed position (see FIG. 3) in which it is disposed generally vertically above the base within the van so that door 5 may be closed. Throughout this specification, "primed" reference characters refer to parts at the side of the lift distal from winch 17 which are essentially identical in shape and function to corresponding parts adjacent the winch.

Base 9 comprises a generally flat base plate 23 longer than the width of platform 11. This plate is adapted to be secured to floor 6, as by bolting, and is substantially as long as doorsill 7. A pair of vertical pulley supports 25, 25′ is secured to plate as by by welding. These supports extend above the level of the base and are spaced approximately the width of platform 11 so that a patient in a wheelchair may readily roll therebetween. Winch 17 is secured to one end of base plate 23 by means of the previously described bracket. It will be noted that with winch 17 secured to the bracket as best shown in FIG. 2, its rotary axis X—X is substantially parallel to the vertical plane in which platform 11 moves.

More particularly, pulley and cable arrangements 15, 15′ each comprise a pair of respective pulleys 27*a*, 27*b*, and 27*a*′, 27*b*′ journalled by platform 11 at each side thereof with pulleys 29*a* and 29*a*′ being located adjacent the inner end of the platform toward base 9 and with pulleys 29*b* and 29*b*′ being located intermediate their respective pulleys 29*a* or 29*a*′ and the outer end of the platform. At least one respective idler pulley 31, 31′ is journalled within a respective pulley support 25, 25′. Each cable and pulley arrangement also includes a respective cable 33 or 33′ with the cables being guided by their respective idler pulleys 31 or 31′ from their respective first pulley 27*a* or 27*a*′ to winding drum 21. Each cable extends up from its idler pulley 31 or 31′ at the base of its pulley support 25 or 25′ to the first pulley 27*a* or 27*a*′ journalled by its pulley support. The cable trains around the first pulley and around its respective pulley 29*a* or 29*a*′ (referred to as the second pulley) on the platform. The cable then extends back up from pulley 29*a* or 29*a*′ to pulley 27*b* or 27*b*′ (referred to as the third pulley) carried by the pulley support and then down to pulley 29*b* or 29*b*′ (referred to as the fourth pulley) on the platform. The end of the cable is secured to the platform in a manner as will be described.

Platform 11 has a safety guard 35 pivotally secured to its outer end for pivoting between a lowered position (shown in phantom in FIG. 1) in which an item to be lifted by lift 1 may readily be rolled on to or off of platform 11 and a raised vertical position (see FIGS. 1 and 2) in which an item, such as a wheelchair, is prevented from rolling off the platform. Guard 35 is biased by torsion springs 37 (see FIG. 2) toward its lowered position. The free or outer ends of cables 33 and 33′ are secured to guard 35, as indicated at 38, so that with the cables carrying the load of the platform as the latter is raised from its lowered horizontal position, the force of the cables on the guard overcomes the bias of springs 37 and holds the guard in its raised position. Upon the platform being lowered to its lowered horizontal position and upon load being removed from cables 33 and 33′, springs 37 move guard 35 to its lowered position.

Figure 2:
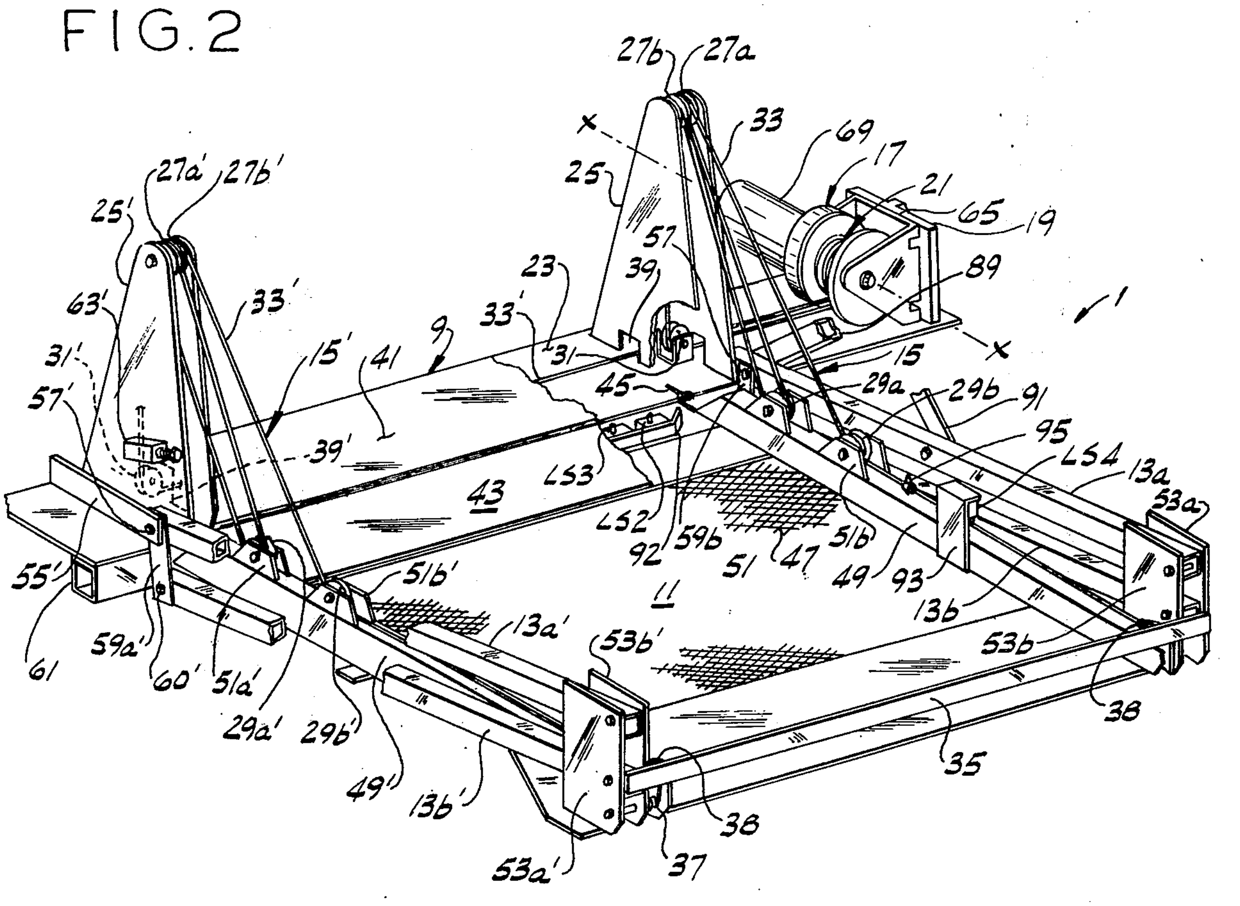
FIG. 2 is an enlarged perspective of the lift in its raised horizontal position.

As best shown in FIG. 2, pulley support 25 closest to winch 17 has openings 39 therein through which cables 33 and 33′ pass and pulley support 25′ has a corresponding opening 39′ for cable 33′. Idler pulleys 31 and 31′ are journalled within their respective pulley supports on axes generally parallel to axis X—X adjacent their respective openings 39 or 39′ for having their respective cables trained therearound. A cover plate 41 overlies cable 33′ as it extends between the pulley supports and protects this cable as a wheelchair or other item rolls thereover. A bridge plate 43 is hingedly secured to the outer edge of base plate 23 between the pulley supports. This bridge plate is swingable between a stowed vertical position (see FIG. 3) and a horizontal bridging position (see FIG. 1). A spring 45 (see FIG. 2) biases the bridging plate to its bridging position so with platform 11 in its raised horizontal position, a wheelchair or the like may readily roll on and off the platform and with the platform in its raised stowed position, the bridge plate is rotated to its raised stowed position.

Platform 11 is shown to comprise a floor grate 47 having side beams 49, 49′ secured thereto. Each side beam has two pairs of spaced lugs 51*a*, 51*b* and 51*a*′, 51*b*′ secured to its upper surface for journalling respective pulleys 29*a*, 29*b* and 29*a*′, 29*b*′ therebetween. At the outer end of the platform at each side thereof, a pair of respective spaced plates 53*a*, 53*b* or 53*a*′, 53*b*′ is secured, as by welding, to the sides of each side beam 49, 49′ to extend thereabove. The outer ends of arms 13*a*, 13*b* and 13*a*′, 13*b*′ are pivotally secured to the outer end of the platform between plates 53*a*, 53*b* and 53*a*′, 53*b*′, respectively. On the outside of each pulley support 25, 25′ and spaced therefrom, a respective vertical lug 55 or 55′ is secured, as by welding, to the upper face of base plate 23. The inner end of each upper arm 13*a*, 13*a*′ is pivotally secured to base 9 between its adjacent pulley support 25, 25′ and its lug 55, 55′ by a respective bolt 57, 57′ for swinging about a horizontal axis. A pair of links 59*a*, 59*b* or 59*a*′, 59*b*′ on the outside of arms 13*a*, 13*a*′, respectively, is also pivotally carried by each of these bolts. The lower arm 13*b*, 13*b*′ of each pair of arms is pinned between these links by respective bolts 60, 60′. Base plate 23 has a stop member 61 secured to its front or outer edge extending substantially the length of the base plate and extending below the level of the base plate. This stop member is engageable by links **59*a*, 59*b*, and 59*a*′, 59*b*′ as platform 11 is lowered from its vertical stowed position to its raised horizontal position and remains in engagement with the links as the platform is raised and lowered between its raised and lowered horizontal positions so as to prevent rotation of the links toward the base beyond a generally vertical position below the swing axis of bolts 57 and 57′. Thus, as the platform moves between its lowered and raised positions, arms 13*a*, 13*b* and 13*a*′, 13*b*′ and their respective links 59*a*, 59*b* and 59*a*′, 59*b*′ and plates 53*a*, 53*b* and 53*a*′, 53*b*′ constitute a parallelogram linkage which, in conjunction with pulley and cable means 15 and 15′**, permit the platform to remain substantially horizontal as it is raised and lowered between its raised and lowered horizontal positions.

In accordance with this invention, base 9 is adapted for universal use with virtually any make of or type of vehicle including vans, pick-up trucks, buses or the like, regardless of whether the vehicle has a recessed well adjacent the doorsill or tailgate thereof where the base is to be mounted. On vehicles which do have such a recess in the floor adjacent the doorsill, base plate 23 may be secured, as by bolting, directly to the floor, with stop member 61 extending down into the recess. In other vehicles not having such a recess, the bottom of the stop member may be placed directly on the floor adjacent the door of the vehicle. A spacer plate 62 (see FIG. 3) generally the size of plate 3 and the thickness of stop member 61 is placed between plate 23 and the floor so that the base is spaced above the floor (approximately one inch) and so that the base is generally level with the floor. Base plate 23 and spacer plate 62 are secured to the floor, as by bolting. Thus, as platform 11 swings from its vertical stowed position to its raised horizontal position, links **59*a*, 59*b* and 59*a*′, 59*b*′ are engageable with the stop member. Thus it can be seen that base 9** is a universal base which can be mounted on virtually any vehicle or similar structure.

Secured to the outside of each pulley support 25, 25′ is a respective resilient stop 63, 63′ engageable by a respective upper arm **13*a*, 13*a*′ as the platform is moved to its vertical stowed position. As these platform arms engage stop 63, 63′ and as the platform continues to move to its vertical stowed position, these stops are resiliently compressed so that an outward biasing force is imposed on the platform to hold cables 33 and 33′** taut and to thus suppress rattling of the lift as the van is driven with the lift in its vertical stowed position.

Winch 17 includes a U-shaped mounting bracket 65 bolted to bracket 19 and a rotary, hollow winch shaft 67 (see FIG. 4) extending between the sides of the U-shaped mounting bracket. Winding drum 21 is fixed to and rotary with shaft 67. A reversible d.c. motor 69 selectively energized by the battery of van 3 is coupled to shaft 67 by a planetary gear arrangement (not shown) enclosed in a housing 71. The mechanical advantage of this planetary gear drive is such as to effectively prevent unwinding of cables 33, 33′ from the drum upon stopping of motor 69 at any position. Thus, the platform is automatically locked in any position in which it is stopped. In the event motor 69 is inoperable, a crank 70 (shown in phantom in FIG. 4) may be inserted in hollow shaft 67 so as to engage the planetary gear drive in housing 71 and to thus permit the winch to be manually operated. Preferably, winch 17 is a commercially available unit, such as sold by the Black & Decker Company of Towson, Md., under their designation "Model 6901". These commercially available units typically have a tapered (i.e., conical) drum 72 which facilitates winding up uniform layers of a single cable on the drum. However, upon attempting to wind two cables simultaneously on the tapered drum, the two cables are wound at unequal speeds thus causing tangling of the cables on the drum and twisting of platform 11.

Figure 4:
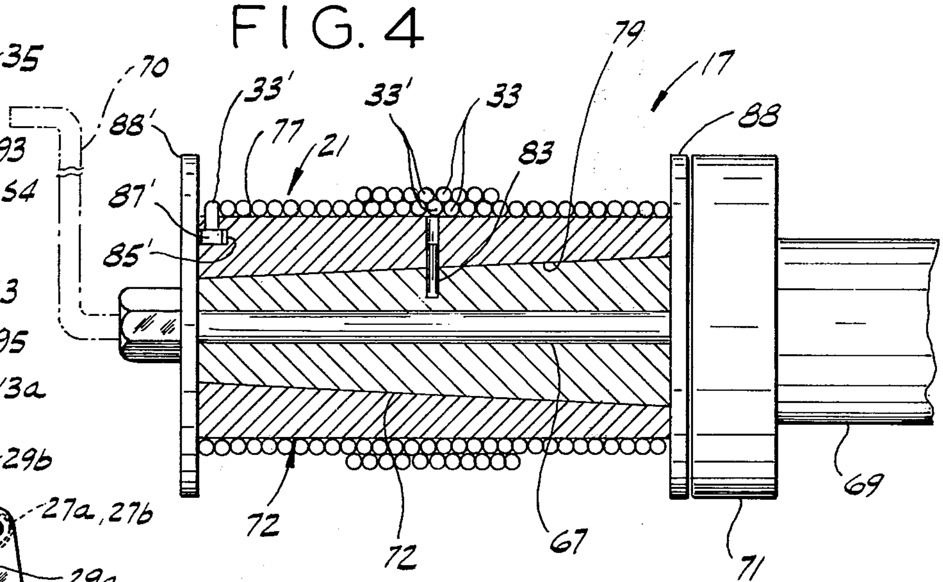
FIG. 4 is an enlarged vertical cross-sectional view of a power operated winch for raising and lowering the platform.
Figure 5:
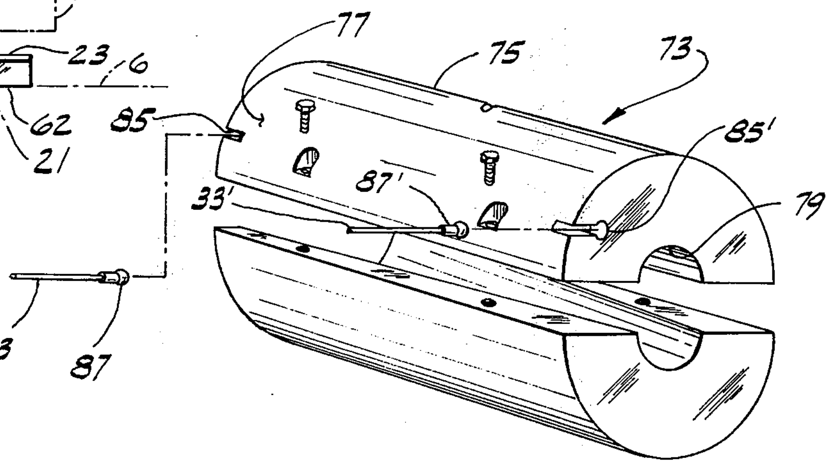
FIG. 5 is a perspective view of a sleeve adapted for securement to a tapered winding drum of a winch for simultaneously winding and unwinding two cables at substantially the same speed.

Referring now to FIGS. 4 and 5, means, as indicated generally at 73, is provided for converting a conventional winch having a tapered drum 72 to a winch which simultaneously winds and unwinds two cables at substantially the same speed. More particularly, this means is shown to comprise a split sleeve 75 having an outer cylindric surface 77 and a tapered inner bore 79 for reception of tapered drum 72. The sleeve halves are releasably secured together by bolts 81 and the sleeve is fixed to drum 72 for rotation therewith by a roll pin 83. At each end of one of the sleeve halves, a recess 85 or 85′ is provided and each cable 33, 33′ has a respective securement member, such as a ball 87, 87′, secured (i.e., swaged) thereto. Thus, each ball 87, 87′ and a portion of each respective cable is received by a respective recess 85, 85′ for securement of the cable to the sleeve. It will thus be noted that each recess 85, 85′ is located on the respective sleeve half in line with one another. This facilitates uniform winding of the cables onto the winding drum and insures that the cable begins lifting platform 11 at substantially the same time. This, in turn, insures that the platform maintains a substantially horizontal position as it is raised and lowered between its raised and lowered horizontal positions without cocking or binding. Reel end plates 88, 88′ are provided at the ends of sleeve 75 to hold cables 33, 33′ and balls 87, 87′ in their respective recesses 85, 85′. Thus it will be understood that winding drum 21 heretofore mentioned includes tapered drum 72 with sleeve 75 secured thereto as above described. Upon rotation of winding drum 21 in one direction, cables 33, 33′ are simultaneously wound up on outer cylindric surface 77 of sleeve 75. The cables form a first layer of cable on the outer cylindric surface of the sleeve extending from the ends of the sleeve toward the center thereof. Upon cables 33, 33′ contacting one another at the center of the sleeve, the cables are forced upwardly to form a second layer which is laid down upon the first layer. Upon continued winding in the stated direction of the winding drum, the second layer will be laid down on the first layer until the cables engage reel end plates 88, 88′ at the ends of the winding drum, at which time they form a third layer. This substantially simultaneous formation of uniform layers will continue until a desired length of cable has been wound up. It can be readily seen that by forming uniform layers of substantially equal diameter on sleeve 75 at substantially the same time, both cables 33 and 33′ are wound up on the drum at substantially the same speed. This insures that platform 11 is maintained in generally horizontal position and does not bind or cock upon raising of lowering of the platform. By operating motor 69 in the opposite direction, the cables are unwound from the drum at substantially the same speed.

Operation of lifting implement 1 of this invention is controlled either by actuation of switches contained in an outside switch box, generally indicated at SB1, on the exterior of van 3 (see FIG. 1), by actuation of switches contained in an inside swich box SB2 on the interior of the van, or by actuation of an operator switch S1 carried on a switch arm 89 movable with the platform and operable by the wheelchair patient being lifted by the platform. It will be understood that outside switch box SB1 and inside switch box SB2 are positioned so as to enable a person in a wheelchair to operate these switches. More particularly, switch arm 89 is pivotally secured to base 9 by bolt 57 on the outside of lug 55. A link 91 is pivotally secured to upper arm 13*a* intermediate the ends thereof is pivotally secured to the switch arm intermediate its ends. Thus, switch arm 89 is movable with platform 11 from a stowed position in which it is generally in the same plane as platform 11 when the latter is in its vertical stowed position to an operating position (see FIG. 1) in which switch S1 carried thereby is in position for convenient operation by a person sitting in a wheelchair supported on the platform.

Outside and inside switch boxes SB1 and SB2 each contain a pair of switches S2 and S3 which respectively control operation of a motor (not shown) for opening and closing door 5 in a well-known manner and which control operation of motor 69 for raising and lowering platform 11. Like switches S3, switch S1 carried on switch arm 89 also controls operation of motor 69. Preferably, switches S1, S2 and S3 are spring loaded to return to a neutral off position and must be held in an actuated position to effect opening of door 5 or movement of the platform. If the switches are released from their actuated positions, the platform will stop at any position. Upon actuation of switch S1 or either of the switches S3, platform 11 is automatically and accurately stopped at its desired next position by limit switches positioned on base 9 and on platform 11. A limit switch LS1 is positioned on pulley support 25′ adjacent resilient stop 63′ for engagement by arm 13*a*′ as the platform moves to its vertical stowed position (see FIG. 3). Actuation of limit switch LS1 terminates operation of motor 69 and thus prevents the winch from applying excessive tension to cables 33, 33′. Other limit switches LS2 and LS3 are mounted on a bar 92 secured to the outer face of stop member 61, this bar being positioned below bridge plate 43 for actuation by the bridge plate as the latter assumes its horizontal bridging position. As the bridge plate swings from its vertical stowed position to its horizontal bridging position under the bias of springs 45, it engages the actuating pins of these limit switches to automatically stop the platform in its raised horizontal position. Upon again actuating one of the switches S1 or S3, the platform may be lowered from its raised horizontal position to its lowered horizontal position. A fourth limit switch LS4 is mounted on a bracket 93 on side beam 49 and an actuator clamp 95 is secured to cable 33 adjacent limit switch LS4. Clamp 95 is adapted to engage the actuator arm of limit switch LS4 as the platform engages the ground and as cable 33 goes slack thereby enabling springs 37 to move safety guard 35 from its raised to its lowered position. Actuation of limit switch LS4 deenergizes motor 69 and thus prevents further unwinding of cables 33 and 33′. Upon actuation of one of the switches S1 or S3 to another actuation position to reverse motor 69 and to wind up cables 33 and 33′, limit switch LS4 is reset by the actuator clamp as cable 33 picks up the weight of the platform and as safety guard 35 is moved to its raised position. It will be seen that by automatically terminating movement of the platform by means of limit switches, the platform is more accurately positioned in proper relation to base 9 or to the ground so as to permit ease of on- and off-loading of a wheelchair patient without requiring accurate control by the operator.

The wiring arrangement interconnecting the above-mentioned switches, motors and limit switches is conventional, and thus for purposes of brevity is not herein included.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A lift comprising a base adapted to be secured to the floor of a van-type passenger vehicle adjacent the doorsill thereof, to the bed of a pickup truck adjacent the tail gate thereof, or to other suitable structure, a lifting platform, means for connecting said platform to said base, a pair of cable and pulley means, one for each side of the platform, interconnecting said base and said platform, each of said cable and pulley means including a cable having securement means fixedly attached thereto, and a winch secured to the base having a tapered winding drum for moving the platform via said cable and pulley means in a generally vertical plane between a lowered horizontal position in which the platform is below the level of the base, a raised horizontal position in which the platform is substantially at the level of the base so that a load may readily be moved horizontally on and off the platform, and a stowed position in which the platform is disposed vertically generally above the base, means for converting said winch having a tapered winding drum to a winch which simultaneously winds and unwinds said two cables of said cable and pulley means at substantially the same speed, said winch further including power operated means for rotating said winding drum, said conversion means comprising a sleeve having an outer cylindric surface and an inner tapered bore for reception of said tapered winding drum, said sleeve being split longitudinally to form sleeve halves which are adapted to be placed around the winding drum, means for releasably securing said sleeve halves together surrounding said winding drum, means for securing said sleeve to said winding drum for rotation therewith, and means adjacent each end of said sleeve for securement of a respective cable thereto comprising a recess at each end of one of said sleeve halves for reception of and engagement with said securement means secured to a respective cable, said recesses being so located relative to one another on said one sleeve half for forming a first layer of cable on said cylindric surface as said winding drum is rotated in one direction, said first layer being progressively wound from the ends of the sleeve inwardly toward the center thereof until said cables engage one another, and for further forming a second layer on the first layer, said second layer being progressively wound on said first layer from the center of the sleeve outwardly toward its ends.

2. The method of simultaneously winding first and second cables at substantially the same speed by a single power driven winch having a tapered winding drum comprising the steps of:

securing a sleeve over said tapered winding drum, said sleeve having a tapered inner bore for reception of said tapered winding drum and an outer cylindric surface;

securing one end of said first cable to one end of said sleeve and securing one end of said second cable to the opposite end of said sleeve;

rotating the winding drum in a cable winding direction whereby both cables are simultaneously wound up onto the outer cylindric surface of said sleeve;

progressively forming a first layer of each of said cables on the outer cylindric surface of the sleeve from the outer ends of sleeve in toward the center of the sleeve as the drum continues to rotate in said cable winding direction, said first and second cables engaging one another substantially at the center of said winding drum; and continuing to rotate said winding drum in said cable winding direction for progressively forming a second layer of each of said cables over its respective first layer with each of said second layers extending outwardly toward the ends of said winding drum.

* * * * *